US011054501B2

(12) United States Patent
Steinbuch et al.

(10) Patent No.: US 11,054,501 B2
(45) Date of Patent: Jul. 6, 2021

(54) DEVICE FOR OPERATING A RADAR DEVICE

(71) Applicant: Robert Bosch GmbH, Stuttgart (DE)

(72) Inventors: Dirk Steinbuch, Wimsheim (DE); Karin Moertlbauer, Weil Der Stadt (DE); Matthias Steinhauer, Steinheim (DE); Michael Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 16/078,828

(22) PCT Filed: Feb. 15, 2017

(86) PCT No.: PCT/EP2017/053371
§ 371 (c)(1),
(2) Date: Aug. 22, 2018

(87) PCT Pub. No.: WO2017/153135
PCT Pub. Date: Sep. 14, 2017

(65) Prior Publication Data
US 2019/0049556 A1      Feb. 14, 2019

(30) Foreign Application Priority Data

Mar. 11, 2016   (DE) .......................... 102016204005.7

(51) Int. Cl.
*G01S 7/35*       (2006.01)
*G01S 13/42*      (2006.01)
(Continued)

(52) U.S. Cl.
CPC .............. *G01S 7/354* (2013.01); *G01S 13/42* (2013.01); *G01S 13/931* (2013.01)

(58) Field of Classification Search
CPC . G01S 15/8979; G01S 13/34; H03H 21/0001; H03G 3/34
See application file for complete search history.

(56) References Cited

U.S. PATENT DOCUMENTS 3,218,641 A * 11/1965 Maynard ................. G01S 13/34
342/101
4,848,354 A * 7/1989 Angelsen ............ G01S 15/8979
600/441
(Continued)

FOREIGN PATENT DOCUMENTS

JP    2011237268 A    11/2011
JP    2012247302 A    12/2012
(Continued)

OTHER PUBLICATIONS

International Search Report for PCT/EP2017/053371, dated May 8, 2017.
(Continued)

*Primary Examiner* — Bernarr E Gregory
(74) *Attorney, Agent, or Firm* — Norton Rose Fulbright US LLP; Gerard Messina

(57) ABSTRACT

A method for operating a radar sensor, having the steps: sending out a transmit signal; reception, by a receive unit, of the transmit signal reflected by at least one target object; evaluation of the receive signal; and regulation of a cutoff frequency of a high-pass filter as a function of the evaluated receive signal.

10 Claims, 3 Drawing Sheets

(51) Int. Cl.
    *G01S 13/931*     (2020.01)
    *G01S 13/00*     (2006.01)

(56) References Cited

U.S. PATENT DOCUMENTS

| | | | |
|---|---|---|---|
| 4,910,799 A * | 3/1990 | Takayama | H03G 3/34 |
| | | | 375/350 |
| 5,365,178 A | 11/1994 | Van Der Pol | |
| 6,593,828 B1 * | 7/2003 | Helfenstein | H03H 21/0001 |
| | | | 333/17.1 |
| 2007/0052581 A1 | 3/2007 | Shima | |
| 2009/0088106 A1 * | 4/2009 | Hwang | H04B 1/30 |
| | | | 455/150.1 |

FOREIGN PATENT DOCUMENTS

| | | |
|---|---|---|
| JP | 2016156751 A | 9/2016 |
| WO | 9214124 A1 | 8/1992 |
| WO | 2005124388 A1 | 12/2005 |
| WO | 2010144936 A1 | 12/2010 |

OTHER PUBLICATIONS

Young-Sik Kim, et al., "A 65 nm CMOS base band filter for 77 GHz automotive radar compensating path loss difference", Microwave Conference Proceedings (APMC), 2012 Asia-Pacific, IEEE, Dec. 4, 2012, pp. 688-690, XP032316233.

* cited by examiner

DEVICE FOR OPERATING A RADAR DEVICE

FIELD

The present invention relates to a method for operating a radar sensor. The present invention also relates to a radar sensor.

BACKGROUND INFORMATION

Radar sensors for detecting the surrounding environment place high demands on the usable dynamic range of the receiver. The dynamic is determined by two components. The first component is a distance dynamic characteristic. The greater the distance from the target object is, the lower the receive level. The radar equation shows that the level of a point target decreases by about 40 dB per decade. The second component is the dynamic characteristic of the backscatter or radar cross-section (RCS). While for example a pedestrian reflects only a low power level, a truck for example produces a much higher power level in the receiver.

The named components have some effects on each other. If a target can no longer be regarded as a point target, but rather is large relative to the antenna lobe, it is no longer completely illuminated by the antenna. A functional relationship arises between the distance from the target and the illumination, and thus the back-scattered cross-section of the target.

While analog blocks of the radar receiver have a very large dynamic range, a dynamic range of the overall system is limited by an analog-digital converter. Each enlargement of the bit width of the converter, and thus of the dynamic range, results in an enlargement of the chip surface and increases the power loss, and has to be carefully weighed for reasons of cost and heat dissipation.

Conventionally, this problem is solved using dynamic compression. This can be achieved by working with the edge of a high-pass filter. The distance dynamic for point targets is in theory for example completely compensated by a second-order high-pass filter for target frequencies at the high-pass edge.

Despite careful design, it may occur that the receiver is overmodulated by a signal. This is undesirable, because in this way new frequency components may arise that could be interpreted as targets. Therefore, modulations in which overmodulation has taken place have to be rejected. In order to again obtain valid data, the overmodulation has to be counteracted; conventionally this is done for example using an automatic gain control (AGC).

In the case of too-strong signals, the gain of the receive amplifier is reduced, which reduces the level of all received signals to the same extent. This does remedy the overmodulation situation, but however also has the result that weak targets can no longer be detected.

BRIEF SUMMARY OF THE INVENTION

It is an object of the present invention to provide an improved method for operating a radar sensor.

According to a first aspect, the object may be achieved by a method for operating a radar sensor in accordance with an example embodiment of the present invention. The method has the steps:
 sending out a transmit signal;
 receiving the transmit signal reflected by a target object, using a receive unit;
 evaluating the receive signal; and
 regulating a cutoff frequency of a high-pass filter as a function of the evaluated receive signal.

Advantageously, in this way it is possible to carry out an adaptation of the receive characteristic as a function of the "strength" of the target. In particular, targets that are at a great distance, or "weak" targets, can still be recognized well even when a strong target is situated in the vicinity of the radar sensor. This is enabled by shifting the cutoff frequency upward as a function of the receive signals, which represent an actual surrounding environment scenario.

According to a second aspect of the present invention, the object may be achieved by a radar sensor having:
 a receive unit;
 a maximum value recognition device for ascertaining a maximum value of a receive signal; and
 a regulating device to which the acquired maximum value of the receive signal and the receive signal can be supplied, a cutoff frequency of the high-pass filter being capable of being regulated by the regulating device as a function of the ascertained maximum value and of the receive signal.

Preferred example specific embodiments of the method according to the present invention are described herein.

An advantageous development of the example method according to the present invention provides that, depending on the evaluated receive signal, a defined number of cutoff frequencies of the high-pass filter is set. In this way, a simple adaptation to an actually acquired surrounding environment scenario can take place, a type of dynamic adaptation of the cutoff frequency to the respective receive situation being carried out.

A further advantageous development of the example method according to the present invention is distinguished in that the cutoff frequency of the high-pass filter is set higher the stronger the receive signal is. In this way, it is supported that the strong near targets are correspondingly attenuated, while in contrast remote targets are still able to be acquired essentially uninfluenced.

A further advantageous development of the example method according to the present invention provides that a maximum value of the receive signal is acquired by a maximum value recognition device, and is supplied to the regulating device together with the receive signal. In this way, it is supported that comprehensive data material is provided for regulating the cutoff frequency, so that a precise adaptation of the cutoff frequency of the high-pass filter to the currently acquired environment scenario is provided.

A further advantageous development of the example method provides that the maximum value is ascertained from all channels of the receive unit. In this way, advantageously a worst-case scenario is realized, whereby a computing expense during the ascertaining and regulating of the cutoff frequency is advantageously supported, the strongest receive channel being taken as decisive. A computing expense for ascertaining the cutoff frequency can in this way advantageously be minimized. In addition, in this way an analog-digital converter of the receive unit can efficiently be protected from a state of saturation.

According to a third aspect of the present invention, the object may be achieved by a non-transitory computer-readable data carrier on which a computer program product is stored. The computer program product includes program code that is executable by an electronic regulating device of a radar sensor. When the program code is executed by the electronic regulating device, the program code causes the electronic regulating device to control the radar sensor to perform a method.

The method, which the radar sensor performs by the electronic regulating device's execution of the program code, includes: sending out a transmit signal; receiving, by a receive unit of the radar sensor, a received signal that (a) is a reflection of the transmit signal reflected by at least one target object and (b) the radar sensor is configured to apply to a high-pass filter in order for the radar sensor to produce an output; evaluating the received signal; and regulating a cutoff frequency of the high-pass filter as a function of the evaluation of the received signal.

In an example embodiment, the evaluating includes identifying presence in the received signal of a frequency below a previously set value of the cutoff frequency and determining whether a power level of the frequency below the previously set value of the cutoff frequency that is in the received signal is greater than a predefined threshold; and the regulating includes, in response to the determination being that the power level is greater than the predefined threshold, raising the value of the cutoff frequency.

In an example embodiment, the received signal includes a plurality of received signals having respective power levels, each from a different one of a plurality of channels of the receive unit; the evaluating includes identifying which of the plurality of received signals from the plurality of channels has a greatest of the respective power levels of received signals of the plurality of channels; and the regulating is based on an analysis of the identified one of the plurality of received signals that has the greatest of the power levels, the regulated cutoff frequency of the high-pass filter being used for all of the plurality of channels.

In the following, the present invention is described in detail, with further features and advantages, on the basis of a plurality of Figures. All described or presented features, by themselves or in any combination, form the subject matter of the present invention, independent of their summarization, and independent of their formulation or representation in the description or in the Figures.

Disclosed method features result analogously from corresponding disclosed device features, and vice versa. This means in particular that features, technical advantages, and embodiments relating to the method for operating a radar sensor result analogously from corresponding embodiments, features, and advantages relating to a radar sensor, and vice versa.

DETAILED DESCRIPTION OF EXAMPLE EMBODIMENTS

In accordance with the present invention, a cutoff frequency of a high-pass filter is adapted to receive signals in such a way that both strong near targets and weak remote targets can be detected well.

For this purpose, instead of regulating a gain level of a receive chain or a transmit power, a cutoff frequency of a high-pass filter used for a dynamic compression is regulated. If the receiver is designed in such a way that the cutoff frequency of the high-pass filter is within the usable frequency range, then by displacing the cutoff frequency upward a reduction of the receive level for near targets can be brought about, while remote targets are essentially not impaired. Because the level in the near range is very high even for small targets, but such targets often disappear in the noise in the far range, this proposed method can produce a performance advantage of the radar sensor.

Figure 1:
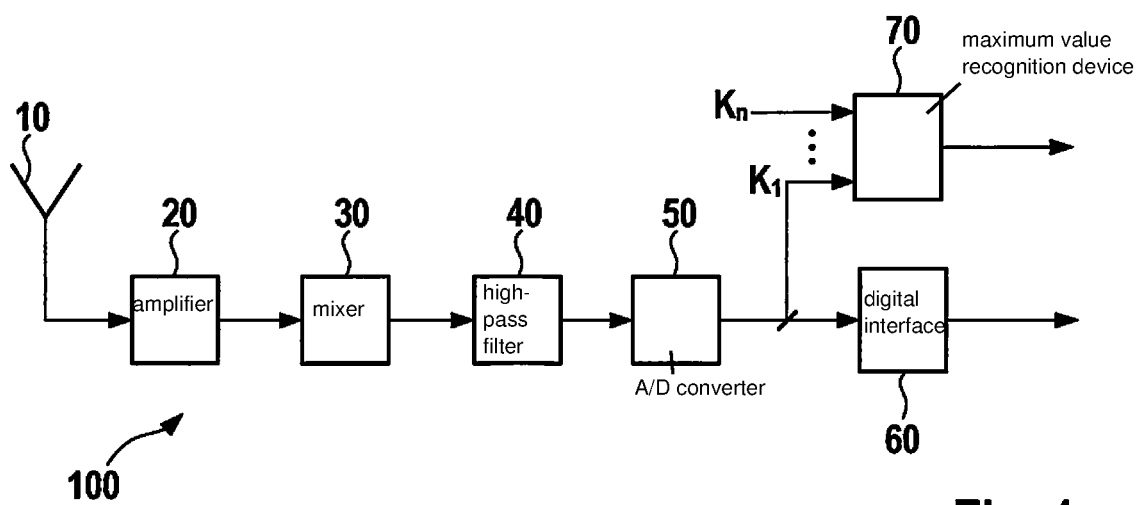
FIG. 1 shows a schematic block diagram of a receive unit of a radar sensor.

FIG. 1 schematically shows a diagram of a receive unit 100 of a radar sensor. Received radar signals are acquired by an antenna 10 and are amplified by an amplifier 20; subsequently, the received radar signals are mixed down into the baseband using a mixer 30. This part of receive unit 100 can still relatively easily meet the high dynamic demands. In order to compress the dynamic characteristic for the following A/D converter 50, a high-pass filter 40 is connected between mixer 30 and A/D converter 50. Output data of receive unit 100 are outputted by a digital interface 60 connected to A/D converter 50, and the data from digital interface 60 are given to an external microcontroller (not shown) for further processing. At the same time, using a maximum value recognition device 70 a maximum value of the time signal over all n channels K1 . . . Kn of receive unit 100 during a sequence is recognized or formed or provided. The data for the maximum value recognition device 70 are thus a kind of extract from the data for the digital interface 60, which can be easily ascertained. According to this design, near targets are imaged at low frequencies, and remote targets are imaged at high frequencies.

Figure 2:
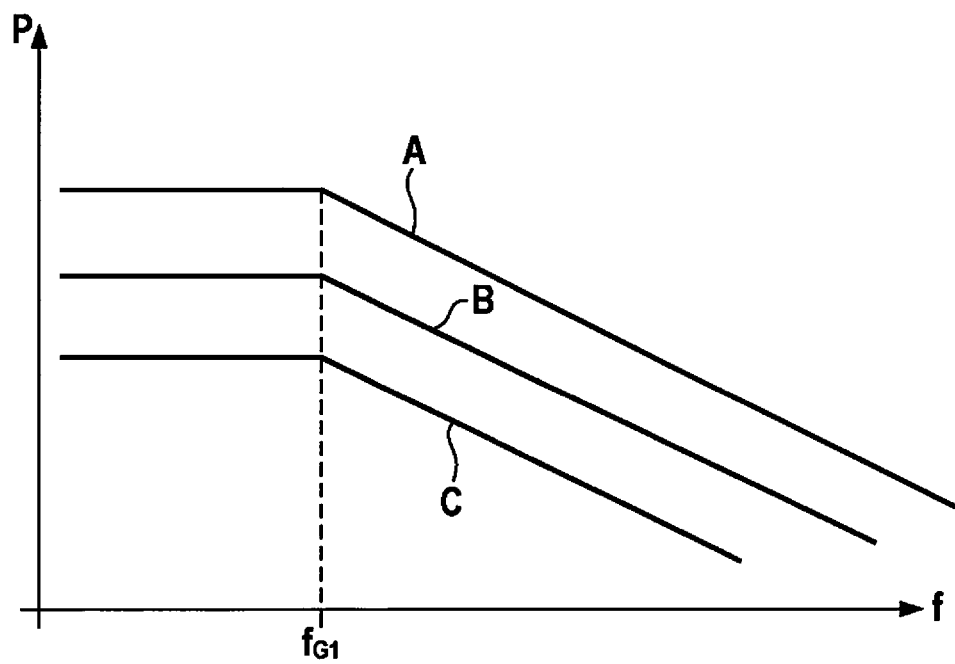
FIG. 2 shows conventional trajectories of frequency characteristic curves of a high-pass filter of a receive unit of the radar sensor.

FIG. 2 shows a conventionally used design with which dynamic differences of radar targets are treated. Here, ahead of time a scenario is defined of targets that are to be acquired by the radar sensor (e.g., pedestrians, motor vehicles, trucks, etc.), and a cutoff frequency of high-pass filter 40 is set corresponding to the defined scenario. Corresponding conventional filter curves or frequency characteristic curves are shown schematically in FIG. 2.

Visible in FIG. 2 are three filter characteristics, or frequency characteristic curves, A, B, C of a high-pass filter of a receive unit of a radar sensor, a maximum receive power P being plotted over a baseband frequency f in each case. The three filter characteristics A, B, C run essentially parallel up to a first cutoff frequency $f_{G1}$, and then fall off in parallel with a defined slope. All three filter characteristics A, B, and C correspond to cases with conventional gain regulation, filter characteristics B, C being displaced downward in parallel relative to filter characteristic A, which disadvantageously has the result that, for large baseband frequencies f, and thus large distances, levels of weak radar targets (e.g. a pedestrian at a remote distance) disappear in the noise. In this way, the conventional radar sensor is in a sense "blind" to remote targets.

Figure 3:
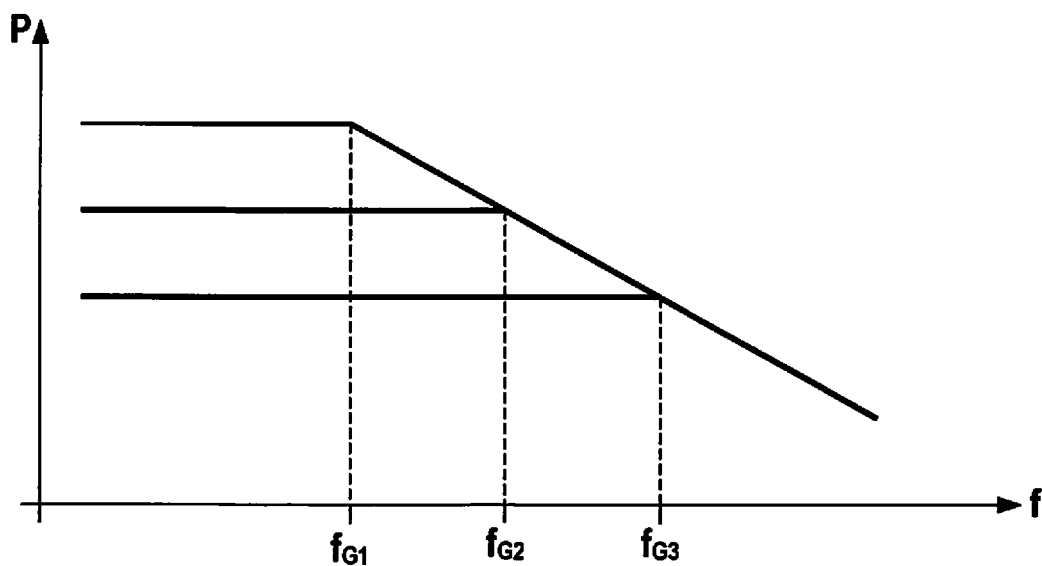
FIG. 3 shows trajectories according to the present invention of frequency characteristic curves of a high-pass filter of the receive unit of the radar sensor.

A proposed filter characteristic of high-pass filter 40 is shown schematically in FIG. 3. A frequency characteristic curve of high-pass filter 40 is shown in FIG. 3 as an example, as a filter characteristic having three cutoff frequencies $f_{G1}$, $f_{G2}$, $f_{G3}$; here a technical outlay can be kept low compared to a continuous (stepless) regulation. The filter order of high-pass filter 40 has been designed such that the level increase (due to the decreasing distance of the targets) is already compensated toward lower frequencies. As a result, the characteristic curve bends off below cutoff frequencies $f_{G1}$, $f_{G2}$, $f_{G3}$, and remains at an essentially constant level until it reaches zero.

Depending on the receive scenario, in this way the cutoff frequency $f_{G1} \ldots f_{G3}$ is dynamically modified, whereby a receive characteristic for the currently present scenario is optimized for the radar sensor, so that as a result both remote and near targets are adequately recognizable.

The cutoff frequencies $f_{G1} \ldots f_{G3}$ that can be set all lie in the useful frequency range of the receiver. For objects at a greater distance, which produce baseband frequencies in the falling-off branch of the characteristic curves of FIG. 3, the dynamic does not change as a result of the regulation of the cutoff frequency; no attenuation takes place. Near objects produce baseband frequencies in the horizontal branch of the characteristic curves, and are thus attenuated by high-pass filter 40. Due to the higher backscatter cross-section when there is a plurality of objects, the dynamic is adequate despite the filter attenuation. In the near range, the filter characteristic curve thus results in an allowance for high input levels.

For the characteristic curves of FIG. 3, as an example it was assumed that the level planning for normal operation provides a configuration having cutoff frequency $f_{G1}$. Before the beginning of a new modulation sequence, the maximum of all n channels K1 ... Kn of the radar sensor is acquired from the preceding sequence using maximum value recognition device 70, and is evaluated. If this maximum is above a defined threshold value and is in the frequency range up to $f_{G1}$, a strong target is present, and a changeover to the configuration having cutoff frequency $f_{G2}$ takes place. The level of the target object below cutoff frequency $f_{G1}$, which would have caused overmodulation of A/D converter 50, is thus reduced, while the levels of the objects above cutoff frequency $f_{G2}$ remain uninfluenced, i.e., are not unnecessarily attenuated. In this way, it is advantageously possible to dynamically regulate or set the cutoff frequencies $f_{G1} \ldots f_{Gn}$ of high-pass filter 40.

The number of three cutoff frequencies $f_{G1} \ldots f_{Gn}$ is to be regarded only as an example; for example, it can also be provided to increase or to reduce the number of cutoff frequencies, two being the minimum number.

Figure 4:
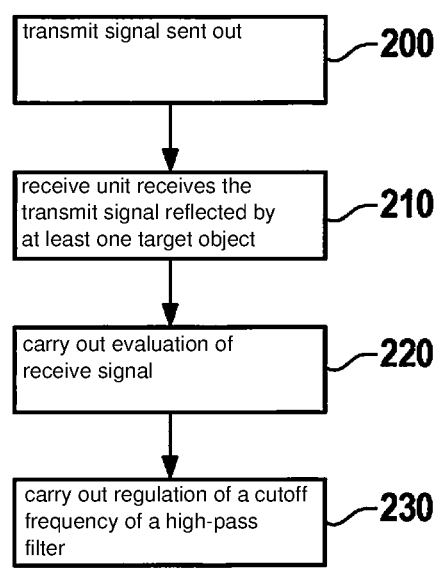
FIG. 4 shows a schematic flow diagram of a specific embodiment of the method according to the present invention.

FIG. 4 shows a schematic sequence of a specific embodiment of the method according to the present invention:

In a step 200, a transmit signal is sent out.

In a step 210, a receive unit receives the transmit signal reflected by at least one target object.

In a step 220, an evaluation of the receive signal is carried out.

In a step 230, a regulation is carried out of a cutoff frequency $f_{G1} \ldots f_{Gn}$ of a high-pass filter 40 as a function of the evaluated receive signal.

Figure 5:
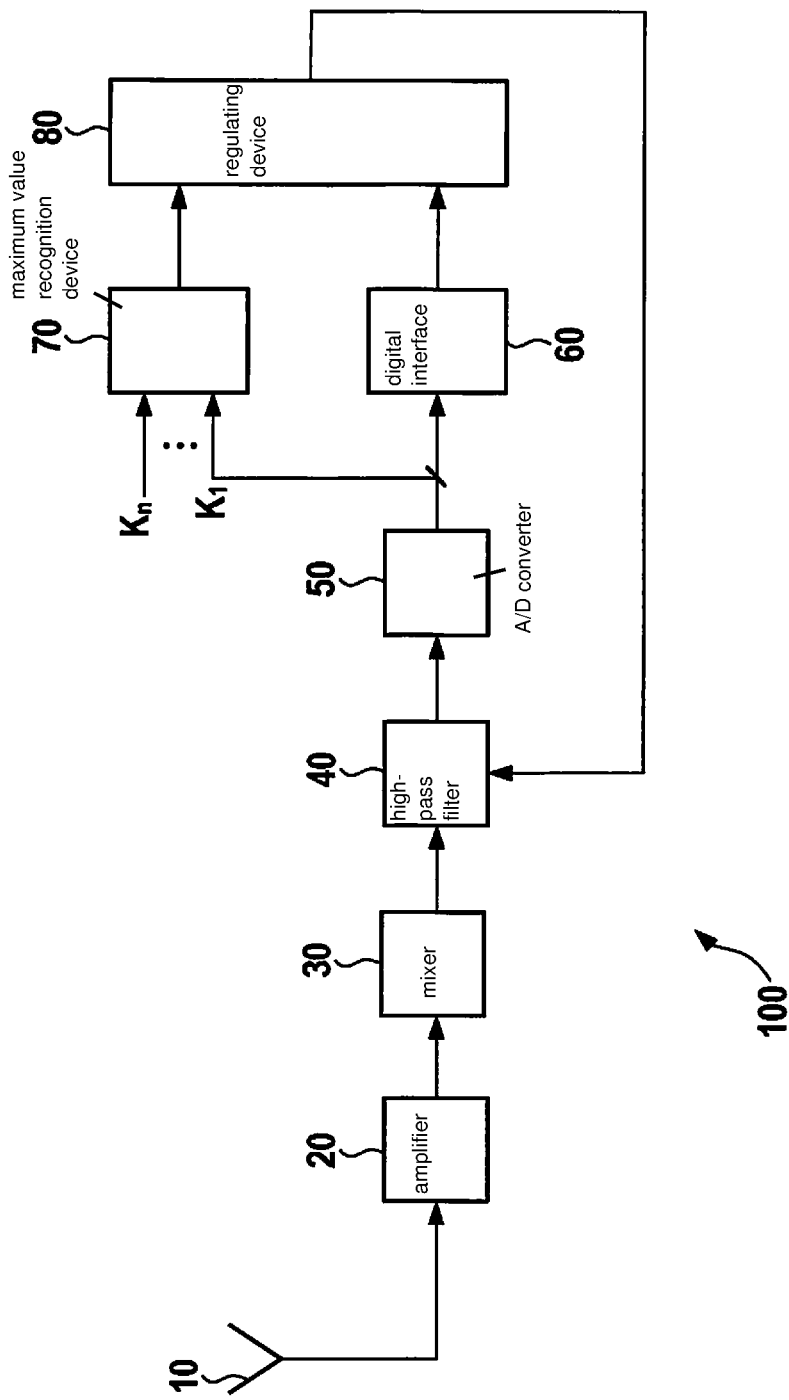
FIG. 5 shows a schematic block diagram of a receive unit of a radar sensor according to the present invention.

FIG. 5 shows a schematic diagram of a specific embodiment of receive unit 100 according to the present invention. Elements of receive unit 100 already explained in FIG. 1 are not again explained, for simplicity. Here, additionally visible are a regulating device 80 to which data are supplied from digital interface 60 and maximum value recognition device 70. As a function of the supplied data, regulating device 80 ascertains and regulates a cutoff frequency $f_{G1} \ldots f_{Gn}$ of high-pass filter 40 in the manner described above. As a result, a regulating feedback path is provided between the receive scenario of the radar sensor and the cutoff frequency of high-pass filter 40. Advantageously, in this way A/D converter 50 of receive unit 100 is protected against a saturation state, because a distance dynamic for targets is essentially eliminated.

Alternatively, and not shown in a Figure, it is also possible to situate regulating device 80 external to receive unit 100.

Preferably, the method for the regulating setting of the high-pass filter cutoff frequency is realized as software, which runs for example on a microcontroller (not shown) or on regulating device 80.

In sum, the present invention provides a method for operating a radar sensor in which a current surrounding environment situation of the radar sensor is ascertained and evaluated in order to dynamically set a cutoff frequency of a high-pass filter. In this way, radar sensors can be realized having high performance for large dynamic differences of the targets, both in the near range and in the far range.

For those skilled in the art, it will be clear that the described features of the present invention can be suitably modified and combined with one another without departing from the core of the present invention.

What is claimed is:

1. A method for operating a radar sensor, comprising:
   sending out a transmit signal;
   receiving, by a receive unit, a received signal, which is a reflection of the transmit signal that is reflected by at least one target object;
   evaluating the received signal; and
   regulating a cutoff frequency of a high-pass filter as a function of the evaluation of the received signal;
   wherein:
   the radar sensor is configured to produce an output by applying the received signal, which is the reflection of the transmit signal, to the high-pass filter;
   the evaluating includes identifying presence in the received signal of a frequency below a previously set value of the cutoff frequency and determining whether a power level of the frequency below the previously set value of the cutoff frequency that is in the received signal is greater than a predefined threshold, and the regulating includes, in response to the determination being that the power level is greater than the predefined threshold, raising the value of the cutoff frequency; and/or
   the received signal includes a plurality of received signals having respective power levels, each from a different one of a plurality of channels of the receive unit, the evaluating includes identifying which of the plurality of received signals from the plurality of channels has a greatest of the respective power levels of received signals of the plurality of channels, and the regulating is based on an analysis of the identified one of the plurality of received signals that has the greatest of the power levels, the regulated cutoff frequency of the high-pass filter being used for all of the plurality of channels.

2. The method as recited in claim 1, wherein a defined number of cutoff frequencies of the high-pass filter are set in accordance with the evaluated received signal.

3. The method as recited in claim 1, wherein the cutoff frequency of the high-pass filter is set higher the stronger the received signal is.

4. The method as recited in claim 1, wherein the radar sensor is configured to produce the output by applying the received signal, which is the reflection of the transmit signal, to the high-pass filter.

5. The method as recited in claim 1, wherein the evaluating includes identifying the presence in the received signal of the frequency below the previously set value of the cutoff frequency and determining whether the power level of the frequency below the previously set value of the cutoff frequency that is in the received signal is greater than the predefined threshold, and the regulating includes, in response to the determination being that the power level is greater than the predefined threshold, raising the value of the cutoff frequency.

6. The method as recited in claim 1, wherein the received signal includes the plurality of received signals having the respective power levels, each from the different one of the plurality of channels of the receive unit, the evaluating includes the identifying of which of the plurality of received signals from the plurality of channels has the greatest of the respective power levels if the received signals of the plurality of channels, and the regulating is based on the analysis of the identified one of the plurality of received signals that has the greatest of the power levels, the regulated cutoff frequency of the high-pass filter being used for all of the plurality of channels.

7. The method as recited in claim 6, wherein the greatest of the respective power levels of the received signals of the plurality of channels is identified by a maximum value recognition device and is supplied to a regulating device together with the received signals for setting of the cut-off frequency based on the identified greatest power level.

8. A method for operating a radar sensor, the method comprising:
 sending out a transmit signal;
 receiving, by a receive unit, a received signal, which is a reflection of the transmit signal that is reflected by at least one target object;
 evaluating the received signal; and
 regulating a cutoff frequency of a high-pass filter as a function of the evaluation of the received signal;
 wherein:
  the radar sensor is configured to produce an output by applying the received signal, which is the reflection of the transmit signal, to the high-pass filter; and
  a greatest power level of the received signal is identified by a maximum value recognition device and is supplied to a regulating device together with the received signal for setting of the cut-off frequency based on the identified greatest power level.

9. A radar sensor, comprising:
 a receive unit configured to receive a received signal, which is a reflection of a transmit signal that is reflected by at least one target; and
 a regulating device; and
 a high-pass filter;
 wherein the regulating device is configured to evaluate the received signal received via the receive device and regulate a cutoff frequency of the high-pass filter as a function of the evaluation of the receive signal; and
 wherein:
  the radar sensor is configured to produce an output by applying the received signal, which is the reflection of the transmit signal, to the high-pass filter;
  the evaluation includes identifying presence in the received signal of a frequency below a previously set value of the cutoff frequency and determining whether a power level of the frequency below the previously set value of the cutoff frequency that is in the received signal is greater than a predefined threshold, and the regulation includes, in response to the determination being that the power level is greater than the predefined threshold, raising the value of the cutoff frequency; and/or
  the radar sensor is configured for the received signal to include a plurality of received signals having respective power levels, each from a different one of a plurality of channels of the receive unit, the evaluation includes identifying which of the plurality of received signals from the plurality of channels has a greatest of the respective power levels of received signals of the plurality of channels, and the regulation is based on an analysis of the identified one of the plurality of received signals that has the greatest of the power levels, the regulated cutoff frequency of the high-pass filter being used for all of the plurality of channels.

10. A non-transitory computer-readable data carrier on which is stored a computer program product having program code that is executable by an electronic regulating device of a radar sensor, the program code, when executed by the electronic regulating device, causing the electronic regulating device to control the radar sensor to perform a method, the method, which the program code of the computer program product stored on the non-transitory computer-readable data carrier causes the radar sensor to perform when the program code is executed by the electronic regulating device, comprising:
 sending out a transmit signal;
 receiving, by a receive unit of the radar sensor, a received signal:
  (a) which is a reflection of the transmit signal that is reflected by at least one target object; and
  (b) which the radar sensor is configured to apply to a high-pass filter in order for the radar sensor to produce an output;
 evaluating the received signal; and
 regulating a cutoff frequency of the high-pass filter, to which the radar sensor is configured to apply the received signal, as a function of the evaluation of the received signal;
 wherein:
  the evaluating includes identifying presence in the received signal of a frequency below a previously set value of the cutoff frequency and determining whether a power level of the frequency below the previously set value of the cutoff frequency that is in the received signal is greater than a predefined threshold, and the regulating includes, in response to the determination being that the power level is greater than the predefined threshold, raising the value of the cutoff frequency; and/or
  the received signal includes a plurality of received signals having respective power levels, each from a different one of a plurality of channels of the receive unit, the evaluating includes identifying which of the plurality of received signals from the plurality of channels has a greatest of the respective power levels of received signals of the plurality of channels, and the regulating is based on an analysis of the identified one of the plurality of received signals that has the greatest of the power levels, the regulated cutoff frequency of the high-pass filter being used for all of the plurality of channels.

* * * * *